United States Patent
Kim et al.

(10) Patent No.: US 7,486,642 B2
(45) Date of Patent: Feb. 3, 2009

(54) APPARATUS AND METHOD FOR RECEIVING CONTROL MESSAGE ON PACKET DATA CONTROL CHANNEL IN A MOBILE COMMUNICATION SYSTEM SUPPORTING PACKET DATA SERVICE

(75) Inventors: Min-Goo Kim, Gyeonggi-do (KR); Sang-Hyuck Ha, Gyeonggi-do (KR); Hye-Jeong Kim, Gyeonggi-do (KR); Se-Hyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 971 days.

(21) Appl. No.: 10/963,539

(22) Filed: Oct. 14, 2004

(65) Prior Publication Data

US 2005/0078640 A1   Apr. 14, 2005

(30) Foreign Application Priority Data

Oct. 14, 2003   (KR) .................. 10-2003-0071478

(51) Int. Cl.
    *H04Q 7/00*   (2006.01)
(52) U.S. Cl. ............... 370/332; 370/333; 370/342; 370/335; 370/353; 370/441; 370/354; 375/152; 375/240.27; 375/340; 375/346; 375/348; 455/67.13; 455/134; 455/296
(58) Field of Classification Search ........... 370/352, 370/332, 353, 441, 335, 354, 413, 389
    See application file for complete search history.

(56) References Cited

U.S. PATENT DOCUMENTS

| | | | | |
|---|---|---|---|---|
| 5,642,377 A | * | 6/1997 | Chung et al. | 375/145 |
| 6,181,683 B1 | * | 1/2001 | Chevillat et al. | 370/329 |
| 6,466,566 B1 | * | 10/2002 | De Gaudenzi et al. | 370/342 |
| 6,724,828 B1 | * | 4/2004 | Dabak | 375/267 |
| 6,741,634 B1 | * | 5/2004 | Kim et al. | 375/144 |
| 6,885,694 B1 | * | 4/2005 | He et al. | 375/144 |
| 7,061,993 B2 | * | 6/2006 | Wieck | 375/316 |
| 7,193,983 B2 | * | 3/2007 | Liang et al. | 370/335 |
| 7,327,779 B1 | * | 2/2008 | Lugil et al. | 375/141 |

* cited by examiner

*Primary Examiner*—Marceau Milord
(74) *Attorney, Agent, or Firm*—Roylance, Abrams, Berdo & Goodman, L.L.P.

(57) ABSTRACT

An apparatus and method for receiving a packet data control channel in a mobile communication system that transmits packet data and has the packet data control channel for transmitting control information related to transmission of packet data are provided. A receiver receives and despreads a signal on the packet data channel and a signal on the packet data control channel, separately outputs the signals, and estimates a noise of a received signal. A signal level detector receives a noise estimation value and samples of the packet data control channel signal from the receiver, and outputs a validity signal for detecting whether information is received over the packet data control channel. A packet data control channel decoder decodes the packet data control channel signal if the validity signal received from the signal level detector is valid.

24 Claims, 16 Drawing Sheets

APPARATUS AND METHOD FOR RECEIVING CONTROL MESSAGE ON PACKET DATA CONTROL CHANNEL IN A MOBILE COMMUNICATION SYSTEM SUPPORTING PACKET DATA SERVICE

PRIORITY

This application claims the benefit under 35 U.S.C. § 119 (a) to an application entitled "Apparatus and Method for Receiving Control Message on Packet Data Control Channel in a Mobile Communication System Supporting Packet Data Service" filed in the Korean Intellectual Property Office on Oct. 14, 2003 and assigned Serial No. 2003-71478, the entire contents of which are incorporated herein by reference.

BACKGROUND OF THE INVENTION

1. Field of the Invention

The present invention relates generally to an apparatus and method for improving a success rate of data transmission in a mobile communication system. In particular, the present invention relates to an apparatus and method for improving reception efficiency of packet data control information in a mobile communication system supporting packet data transmission.

2. Description of the Related Art

Mobile communication systems are provided to allow mobile stations to perform communication regardless of their locations. A Code Division Multiple Access (CDMA) system is a typical example of the mobile communication system. The CDMA system, a synchronous mobile communication system, has been evolving from an IS-95 system into IS-2000 system, CDMA2000 1x Evolution for Data Only (1x EV-DO) system, and CDMA2000 1x Evolution for Data & Voice (1x EV-DV) system. Currently, as for the synchronous mobile communication system, standardization on the CDMA2000 1x EV-DV system has entered into its final phase.

All the systems stated above can support packet data transmission, and the CDMA2000 1x EV-DO system and the CDMA2000 1x EV-DV system can support high-speed packet data transmission. The two systems support high-speed packet data transmission using different schemes. First, a description will be made of packet data transmission in the CDMA2000 1x EV-DV system, the most advanced mobile communication system.

FIG. 1 is a block diagram for a packet data service in a CDMA2000 1x EV-DV system based on the current standard. As illustrated in FIG. 1, a base station (BS) 100 has a plurality of mobile stations (MSs) 111, 112 and 113. To transmit forward high-speed packet data to a particular mobile station, the base station 100 transmits the data over a forward packet data channel (F-PDCH). In order to transmit data over the high-speed packet data channel, the base station 100 should necessarily transmit a forward packet data control channel (F-PDCCH) with the F-PDCH. That is, according to the standard, the F-PDCCH has the same transmission duration and transmission instant as the F-PDCH for carrying a transmission packet. Thus, two types of data on a packet data channel and a packet data control channel are simultaneously transmitted to a mobile station. Therefore, the packet data control channel is a physical channel that the base station 100 should necessarily transmit in order to transmit a packet data service to a particular mobile station. Information transmitted over the packet data control channel includes:

1) Walsh_Mask: information on a fragmented Walsh code available for a forward packet data channel (F-PDCH) at stated periods.
2) MAC_ID (Medium Access Control layer Identification): MAC ID of a mobile station (MS) to which F-PDCH is assigned.
3) ACID (ARQ (Automatic Repeat Request) Channel ID): ID for identifying 4 ARQ channels.
4) SPID (Subpacket ID): ID for identifying an IR pattern of a subpacket.
5) EP_NEW: information for identifying two consecutive encoder packets in the same ARQ channel.
6) EP_SIZE: size (or number) of bits constituting an encoder packet.
7) LWCI (Last Walsh Code Index): information on a Walsh code used for F-PDCH.

In the CDMA2000 1x EV-DV system, a forward packet data control channel has 3 types of slot formats: 1-slot format, 2-slot format and 4-slot format, and each slot is 1.25 msec long. Therefore, the 1-slot format, 2-slot format and 4-slot format have transmission durations of 1.25 msec, 2.5 msec and 5.0 msec. respectively.

When the base station 100 transmits packet data to a mobile station, a target mobile station to which the packet data is to be transmitted is selected by a scheduler (not shown in FIG. 1) included in the base station 100. The scheduler in the base station 100 selects a target mobile station to which it will transmit packet data at every transmission instant by considering channel information and a status of a buffer in which the transmission data is stored. The channel information includes a carrier-to-noise ratio (CNR) or a carrier-to-interference ratio (CIR). After selecting a particular target mobile station by considering the channel information and the buffer status information, the scheduler in the base station 100 also determines the number of slots for which it will transmit packet data. In this case, however, the base station does not transmit slot format information (SFI) of a forward packet data control channel (F-PDCCH), determined by the base station 100, to the target mobile station receiving the packet data. Therefore, an F-PDCCH receiver of the mobile station must detect slot format information (SFI) determined by the base station 100 from a received F-PDCCH signal. Such a slot format detection scheme in which an F-PDCCH receiver of a mobile station detects a slot format is called "Blind Slot Format Detection (BSFD)."

FIG. 2 is a block diagram of a transmitter for transmitting data on a forward packet data control channel and a control message on the packet data control channel based on the 1x EV-DV standard. In FIG. 2, 1-slot format, 2-slot format and 4-slot format are represented by n=1, n=2 and n=4, respectively. Different symbol repetition and symbol puncturing are selectively used according to the slot formats. A description will now be made of information transmitted in FIG. 2, and a structure and operation for processing the information.

A control message 201 transmitted over a forward packet data control channel comprises the information described above, and the control message 201 comprises 13 bits. In FIG. 2, an expression of "1.25n" refers to the product of a unit slot length of 1.25 msec and a slot format value of 'n'. The 13-bit control message 201 is input to an adder 211. In addition, because the CDMA2000 1x EV-DV system is a synchronous system, a system time 202 matched to a reference time is input to an offset selector 210. The system time is used to randomize information bits transmitted over a forward packet data control channel and convert the randomized information bits into a random sequence. Therefore, a 13-bit random number is received from the system time every 1.25 msec. Accordingly, the offset selector 210 generates an offset to be used in the base station using the received system time, and outputs the offset to the adder 211. The adder 211 adds the received control message 201 to the offset in synchronism with the system time, and outputs the addition result to a Medium Access Control layer Identification (MAC_ID) combiner 212.

The MAC_ID combiner 212 receives an 8-bit MAC_ID 203 for identifying users. The MAC_ID combiner 212 exclusive-ORs (XORs) the received control message and the 8-bit MAC_ID 203 according to a particular binary pattern. XORing the control message and the MAC_ID 203 in the MAC_ID combiner 212 is performed because double CRCs are used. The double CRCs can be classified into an "outer frame quality indicator" and an "inner frame quality indicator." The outer frame quality indicator is XORed with the MAC_ID. Therefore, in FIG. 2, the MAC_ID combiner 212 is represented by an "8-bit CRC-covered MAC_ID."

Information output from the MAC_ID combiner 212 is input to a CRC adder 213. The CRC adder 213 adds an 8-bit CRC to the information output from the MAC_ID combiner 212 so that a receiver can determine whether a received control message is defective. The output of the CRC adder 213 becomes an inner frame quality indicator. Information output from the CRC adder 213 is input to a tail bit adder 214. The tail bit adder 214 adds 8 tail bits to the CRC-added information. The tail bits are used for zero state termination performed in a convolutional encoder 215. That is, if a 13-bit information word to which the MAC_ID and CRC are added are input together with 8 tail bits, a convolutional code always terminates at a zero state on a trellis. Information output from the tail bit adder 214 is input to the convolutional encoder 215. The convolutional encoder 215 performs encoding for correcting an error in a transmission control message from noises occurring in a radio environment of a forward packet data control channel. A coding rate is set differently according to the slot format.

An output of the convolutional encoder 215 undergoes symbol repetition in a symbol repeater 216, and undergoes symbol puncturing in a symbol puncturer 217, and an output of the symbol puncturer 217 is input to a block interleaver 218. In the symbol repeater 216 and the symbol puncturer 217, symbol repetition and symbol puncturing are also performed differently according to slot format, as shown in the bottom of FIG. 2. The block interleaver 218 block-interleaves input symbols according to the slot format, and the block-interleaved symbols undergo signal mapping in a signal point mapper 219. The mapped symbols after being block-interleaved are multiplied by a channel gain in a channel gainer 220, and then transmitted over a forward packet data control channel.

A description will now be made of a structure of a receiver for receiving a forward packet data control channel and a method for checking performance of the receiver in a CDMA2000 1x EV-DV system using the forward packet data control channel. FIG. 3 is a simplified block diagram of a forward packet data control channel receiver for receiving information on a forward packet data control channel in a CDMA2000 1x EV-DV system.

Referring to FIG. 3, a transmission control message, or data, is input to a double CRC adder 301, and the CRC adder 301 performs double CRC processing on the received control message using MAC_ID and CRC added thereto. The double CRC-processed data is coded in a convolutional encoder 302. The coded symbols are subjected to symbol repetition and symbol puncturing in a symbol repeating and puncturing part 303, and then subjected to channel interleaving in a channel interleaver 304. The channel interleaver 304 is used to scatter burst errors occurring in a received signal due to multipath fading channel. The symbols interleaved by the channel interleaver 304 are input to a receiver through a channel environment 310.

The receiver is roughly divided into a reception processor 320 and a blind detector 330. A description will first be made of the reception processor 320. A channel deinterleaver 321 deinterleaves channel-interleaved symbols. The deinterleaved symbols are input to a symbol combining and erasure insertion part 322. The symbol combining and erasure insertion part 322 performs a reverse process of the symbol repetition and symbol puncturing process performed for transmission of a forward packet data control channel, on the deinterleaved symbols. The symbols output from the symbol combining and erasure insertion part 322 are input to a Viterbi decoder 323. The Viterbi decoder 323 is a general decoder used for decoding the symbols convolutional-coded by the convolutional encoder 302. The Viterbi decoder 323 decodes the convolution-coded symbols and outputs a control message. A CRC/MAC_ID checker 324 checks CRC and MAC_ID in the control message. A method detecting a control message on a forward packet data control channel in the CRC/MAC_ID checker 324 can be roughly divided into the following two methods.

In a first method, a receiver performs CRC check using both a Viterbi-decoded 13-bit information word and an inner CRC coded with MAC_ID, and then detects a control message therefrom. In a second method, the receiver additionally performs outer CRC check, or actual CRC check, after performing the first CRC check, and detects a control message only when the two CRC check results are both good.

A detailed description will now be made of 7 types of control messages transmitted over the packet data control channel. As illustrated in FIG. 4A, a message transmitted over the packet data control channel can be roughly divided into two parts. FIG. 4A is a diagram illustrating a format of a control message transmitted over a packet data control channel. As illustrated in FIG. 4A, a control message transmitted over a packet data control channel is roughly divided into a MAC_ID part 410 and a service data unit (SDU) part 420. The MAC_ID part 410 comprises 8 bits and the SDU part 420 comprises 13 bits, so that the packet data control channel receives information of a total of 21 bits. To indicate that packet data is transmitted over a packet data channel, the SDU part 420 indicates a control message on a packet data control channel is configured as illustrated in FIG. 4B. To transmit information indicating early termination of cell switching or conversion to an activated mode, the control message is configured as illustrated in 4C. Finally, to transmit information on a Walsh mask available for all mobile stations located in a base station to the mobile stations, the control message on a packet data control channel is configured as illustrated in FIG. 4D.

As illustrated in FIG. 4D, when information on a Walsh mask available for mobile stations is transmitted, the MAC_ID part 410 comprises all zero bits. In this case, a Walsh mask to be used for all mobile stations in communication with a corresponding base station must be changed. Therefore, the mobile station always checks the MAC_ID when decoding a forward packet data control channel, and performs different operations according to whether the MAC_ID has all zero bits.

For high-speed data transmission, the CDMA2000 1x EV-DV system employs Fast Hybrid Automatic Repeat Request (FHARQ) in order to improve the performance of a physical channel. Commonly, FHARQ uses N ARQ channels, and the CDMA2000 1x EV-DV system employs N=4 FHARQ. With reference to FIGS. 5A and 5B, an example of N=4 FHARQ will be described herein below.

FIG. 5A is a timing diagram illustrating transmission of packet data and ACK/NAK signal in a CDMA2000 1x EV-DV system employing N=4 FHARQ in which packet data is continuously transmitted to mobile stations.

As illustrated in FIG. 5A, a base station, or a transmitter, can continuously transmit data through a maximum of 4 HARQ channels. Therefore, in the case where the base station continuously performs HARQ transmission to 4 mobile stations A, B, C and D, the mobile station A is assigned HARQ ID=0, the mobile station B is assigned HARQ ID=1, the mobile station C is assigned HARQ ID=2, the mobile station D is assigned HARQ ID=3. Thereafter, HARQ ID=0 can be reassigned to the mobile station A, or to another mobile station. In the case of FIGS. 5A and 5B, HARQ ID=0 is reassigned to the mobile station A. A transmission scheme in which FHARQ channels are assigned to different users in this manner is called "user diversity." User diversity has been proposed to maximize the efficiency of channel resources.

Referring to FIG. 5A, packet data 510a to be transmitted to the mobile station A is transmitted over a forward packet data channel 511 and information on the packet data 510a is transmitted over a forward packet data control channel 512. Then a receiver, or the mobile station A, receives packet data 510b that experienced a change in radio channel environment. Thereafter, the receiver has a no-operation interval (NOI) 502a for which it receives no signal over a packet data channel and a packet data control channel until an FHAQR channel is assigned again thereto. For the NOI 502a, the receiver performs demodulation and decoding on the received packet data, and transmits a response signal, or ACK/NAK signal, over a reverse ACK channel (R-ACKCH). Then the base station transmits new packet data if an ACK signal is received from the mobile station A, and retransmits the initially-transmitted packet data if a NAK signal is received from the mobile station A. The packet data to be initially transmitted or to be retransmitted is represented by reference numeral 520a, and the packet data that experienced a change in radio channel environment is represented by reference numeral 520b.

With reference to FIG. 5A, a description has been made of the NOI 502a for which data is transmitted to other mobile stations. As another example, there is a no-operation interval for which all mobile stations are inactivated as no data is transmitted from the base station to the mobile stations. A description thereof will be made with reference to FIG. 5B.

FIG. 5B is a timing diagram illustrating transmission of packet data and ACK/NAK signal in a CDMA2000 1x EV-DV system employing N=4 FHARQ in which there is an interval for which no packet data is transmitted. Referring to FIG. 5B, packet data 510a to be transmitted from the base station to the mobile station A is transmitted over a forward packet data channel 511 and information on the packet data 510a is transmitted over a forward packet data control channel 512. Then a receiver, or the mobile station A, receives packet data 510b that experienced a change in radio channel environment. Thereafter, the receiver has a no-operation interval (NOI) 502b for which it receives no signal over a packet data channel and a packet data control channel until a FHAQR channel is assigned again thereto. The NOI 502b is different from the NOI 502a. The base station transmits packet data to other mobile station for the NOI 502a, but the base station transmits packet data to none of the mobile stations for the NOI 502b. To distinguish the NOIs from each other, the NOI 502a will be refereed to as a "transmission NOI," and the NOI 502b will be referred to as a "non-transmission NOI." For the non-transmission NOI, no data is transmitted and only noises are transmitted. Thus, for both the non-transmission NOI and the transmission NOI, the mobile station A is not assigned a packet data control channel, so that it should not perform any operation.

Referring back to FIG. 5B, the receiver receiving the packet data performs demodulation and decoding on the received packet data, and transmits an ACK/NAK signal over a reverse ACK channel (R-ACKCH). Then the base station transmits new packet data if an ACK signal is received from the mobile station A, and retransmits the initially-transmitted packet data if a NAK signal is received from the mobile station A. In the case of FIG. 5B, the mobile station A retransmits an ACK/NAK signal 514 as the base station fails to receive an initially-transmitted ACK/NAK signal 513. The packet data to be initially transmitted or to be retransmitted in response to the retransmitted ACK/NAK signal 514 is represented by reference numeral 520a, and the packet data that experienced a change in radio channel environment is represented by reference numeral 520b.

In other case, all FHARQ channels may be assigned to only one mobile station. However, a description thereof will be omitted herein.

According to the CDMA2000 1x EV-DV standard, a mobile station using a packet data channel for packet transmission demodulates packet data received over the packet data channel only when a packet data control channel is assigned thereto. Based on the demodulation result, the mobile station transmits an ACK/NAK signal over a reverse ACK channel. In an actual operation of the system, however, a mobile station may possibly make an error due to noises and disturbances occurring in a channel. The mobile station makes an error in the following cases.

First, although a base station transmits packet data and a packet data control message to a particular mobile station, the mobile station may fail to correctly receive the packet data control message due to noises or disturbances in a packet data control channel. In this case, due to an error in the packet data control channel, the mobile station cannot recognize whether a packet data channel is transmitted. Therefore, the mobile station fails to receive packet data transmitted by the base station. Although the mobile station receives packet data over a packet data channel, it fails in decoding the packet data received over the packet data channel due to a defective control message. In this case, the mobile station transmits a NAK signal over a reverse ACK channel. However, because the packet data can be retransmitted by FHARQ, the mobile station does not have a serious problem except a slight delay and a reduction in transmission efficiency of channels.

Second, although a base station transmits packet data and a packet data control message to a particular mobile station, the mobile station may fail to correctly receive the packet data and the packet data control message due to noises or disturbances in a packet data control channel. In particular, the MAC_ID has all zero bits as illustrated in FIG. 4D due to an error in the packet data control channel. In this case, because the MAC_ID has all zero bits, the mobile station mistakes the packet data control message for Walsh mask update information. Therefore, the mobile station changes its own Walsh mask due to the wrong information. Thereafter, although the base station transmits packet data, the mobile station cannot decode packet data received over a packet data channel due to a Walsh decoding error. This continues until the Walsh mask is updated. Therefore, when the base station transmits packet data to the mobile station whose Walsh mask is updated due to an error, the mobile station cannot continuously receive packet data, thereby interrupting a packet data service.

This will be described with reference to FIG. 6 by way of example. FIG. 6 is a timing diagram illustrating a time for which a mobile station fails to receive packet data as a Walsh mask is changed due to an error in a forward packet data control channel. Referring to FIG. 6, a Walsh mask currently in use is transmitted at a time T0. A base station configures a Walsh mask into a control message illustrated in FIG. 4D, and transmits the control message over a packet data control channel at stated periods. In FIG. 6, a Walsh mask update period 600 ranges from the time T0 to a time T2. Therefore, the receiver should continuously use the Walsh mask received at the time T0 until a time at which it receives the next Walsh mask. However, in the second case, the mobile station cannot continuously receive packet data from a time T1 at which a Walsh mask is changed due to a Walsh mask error (See 602) to the time T2 at which the Walsh mask is updated.

If the Walsh mask is updated in this way, even though the receiver determines from a packet data control channel that packet data is transmitted thereto, it fails in demodulating and decoding the packet data. Therefore, the receiver continuously transmits a NAK signal over a reverse ACK channel each time packet data is received. Such a false NAK signal is called a "false alarm."

Third, when a base station transmits packet data and a packet data control message to a particular mobile station, a mobile station may mistake the packet data control message for its packet data control message due to noises or disturbances in the packet data control channel. In this case, the mobile station fails in decoding packet data received over a forward packet data channel, so that it cannot extract normal data. Therefore, the mobile station transmits a NAK signal over a reverse ACK channel. In this case, however, because the base station transmitted no packet data to the mobile station, the base station is allowed to disregard the NAK signal received over the reverse ACK channel. Alternatively, the mobile station can check again the control message which was not transmitted thereto through MAC ID detection. Therefore, in this case, the mobile station does not have a serious problem. However, occupation of a reverse ACK channel (R-ACKCH) for reverse transmission of an ACK/NAK signal and a reverse channel quality indicator channel (R-CQICH) for CIR transmission by a non-selected mobile station causes unnecessary occupation of reverse channel resources and interference to R-ACKCH of a normal mobile station, thereby deteriorating the quality of an R-ACKCH signal from the selected mobile station.

Fourth, when a base station transmits packet data and a packet data control message to a particular mobile station, a mobile station may mistake the packet data, control message for its packet data control message due to noises or disturbances in the packet data control channel and, particularly, mistakes MAC_ID for all-zero MAC_ID, i.e., Walsh mask update information, due to an error in the forward packet data control channel. In this case, the mobile station changes its own Walsh mask due to the incorrect information. Therefore, although the mobile station decodes packet data received over the forward packet data channel, most of the packet data suffers from decoding error because of a Walsh demodulation error. Thus, the mobile station transmits a NAK signal over a reverse ACK channel. As described in the second case, such an event is continuously repeated unless the Walsh mask is updated again.

As described above, when the Walsh mask is changed due to an error in a packet data control channel, an error continuously occurs in received packet data. Therefore, unless the base station transmits again a Walsh mask, a reception error for a forward packet data channel continuously occurs due to the wrong Walsh mask information. Such an event can happen in the case of FIGS. 5A and 5B. Therefore, the receiver, or the mobile station, requires a method for preventing such an error.

SUMMARY OF THE INVENTION

It is, therefore, an object of the present invention to provide an apparatus and method for correcting a possible false alarm from occurring in a mobile communication system that transmits packet data over a packet data channel and transmits Walsh mask information over a packet data control channel.

It is another object of the present invention to provide an apparatus and method for increasing channel efficiency by rapidly removing a false alarm for a channel in a mobile communication system that transmits packet data over a packet data channel and transmits Walsh mask information over a packet data control channel.

It is further another object of the present invention to provide an apparatus and method for reducing interference caused by a false alarm in a mobile communication system that transmits packet data over a packet data channel and transmits Walsh mask information over a packet data control channel.

In accordance with a first aspect of the present invention, there is provided an apparatus for receiving a packet data control channel in a mobile communication system that transmits packet data and has the packet data control channel for transmitting control information related to transmission of packet data. The apparatus comprises a receiver for receiving and despreading a signal on the packet data channel and a signal on the packet data control channel, separately outputting the signals, and estimating a noise of a received signal; a signal level detector for receiving a noise estimation value and samples of the packet data control channel signal from the receiver, and outputting a validity signal for detecting whether information is received over the packet data control channel; and a packet data control channel decoder for decoding the packet data control channel signal if the validity signal received from the signal level detector is valid.

In accordance with a second aspect of the present invention, there is provided an apparatus for receiving a packet data control channel in a mobile communication system that transmits packet data in multiple slot lengths and has the packet data control channel for transmitting control information related to transmission of the packet data in multiple slot lengths. The apparatus comprises a receiver for receiving and despreading a signal on the packet data channel and a signal on the packet data control channel, and separately outputting the signals; a signal level detecting part for receiving samples of the packet data control channel signal from the receiver and outputting a validity signal for detecting whether information is received over a packet data control channel; a packet data control channel decoder for decoding the packet data control channel signal, and outputting the decoded signal and slot format information; a switch for switching on or off an output of the packet data control channel decoder; and a slot format indicator comparator for controlling the switch using the slot format information and the validity signal.

In accordance with a first aspect of the present invention, there is provided a method for receiving a packet data control channel in a mobile communication system that transmits packet data and has the packet data control channel for transmitting control information related to transmission of packet data. The method comprises the steps of receiving and despreading a signal on the packet data channel and a signal on the packet data control channel, and separately outputting the signals; outputting a noise estimation value by estimating a noise of a signal received over the packet data control channel; detecting whether information is received over the packet data control channel using the noise estimation value and samples of the packet data control channel signal; and decoding the packet data control channel signal if it is determined that information is received over the packet data control channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
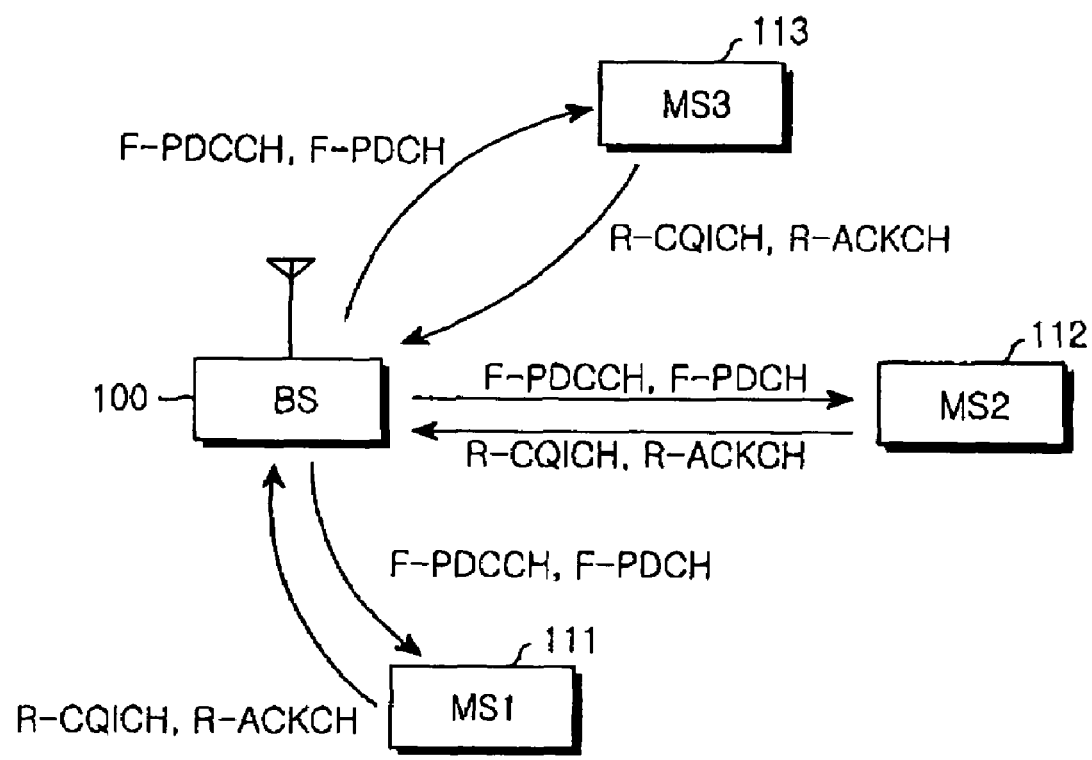
FIG. 1 is a block diagram for a conventional packet data service in a Code Division Multiple Access 2000 (CDMA2000) 1x evolution-Data and Voice (1x EV-DV) system based on the current standard.
Figure 2:
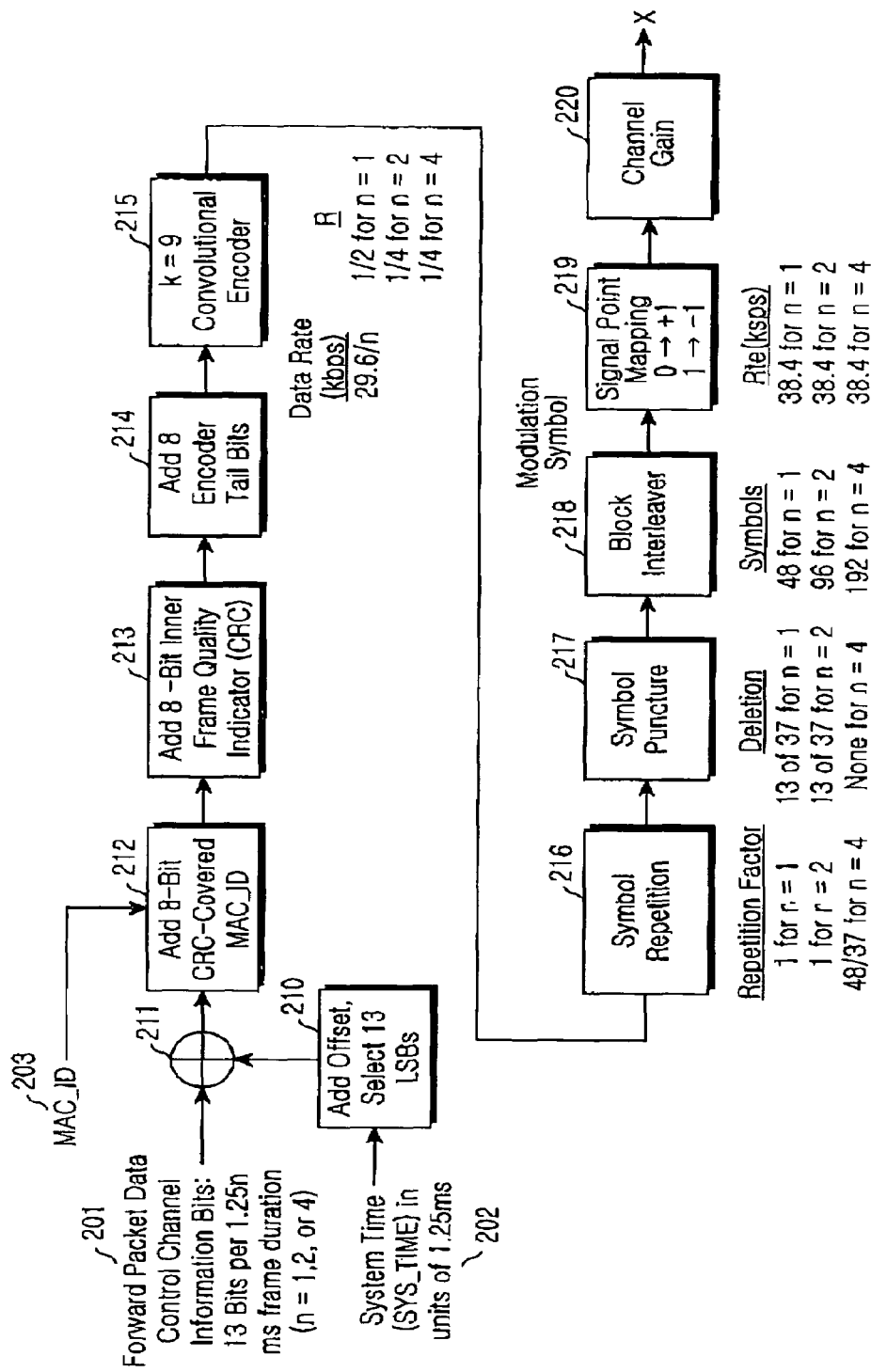
FIG. 2 is a block diagram of a conventional transmitter for transmitting data on a forward packet data control channel and a control message on the packet data control channel based on the 1x EV-DV standard.
Figure 3:
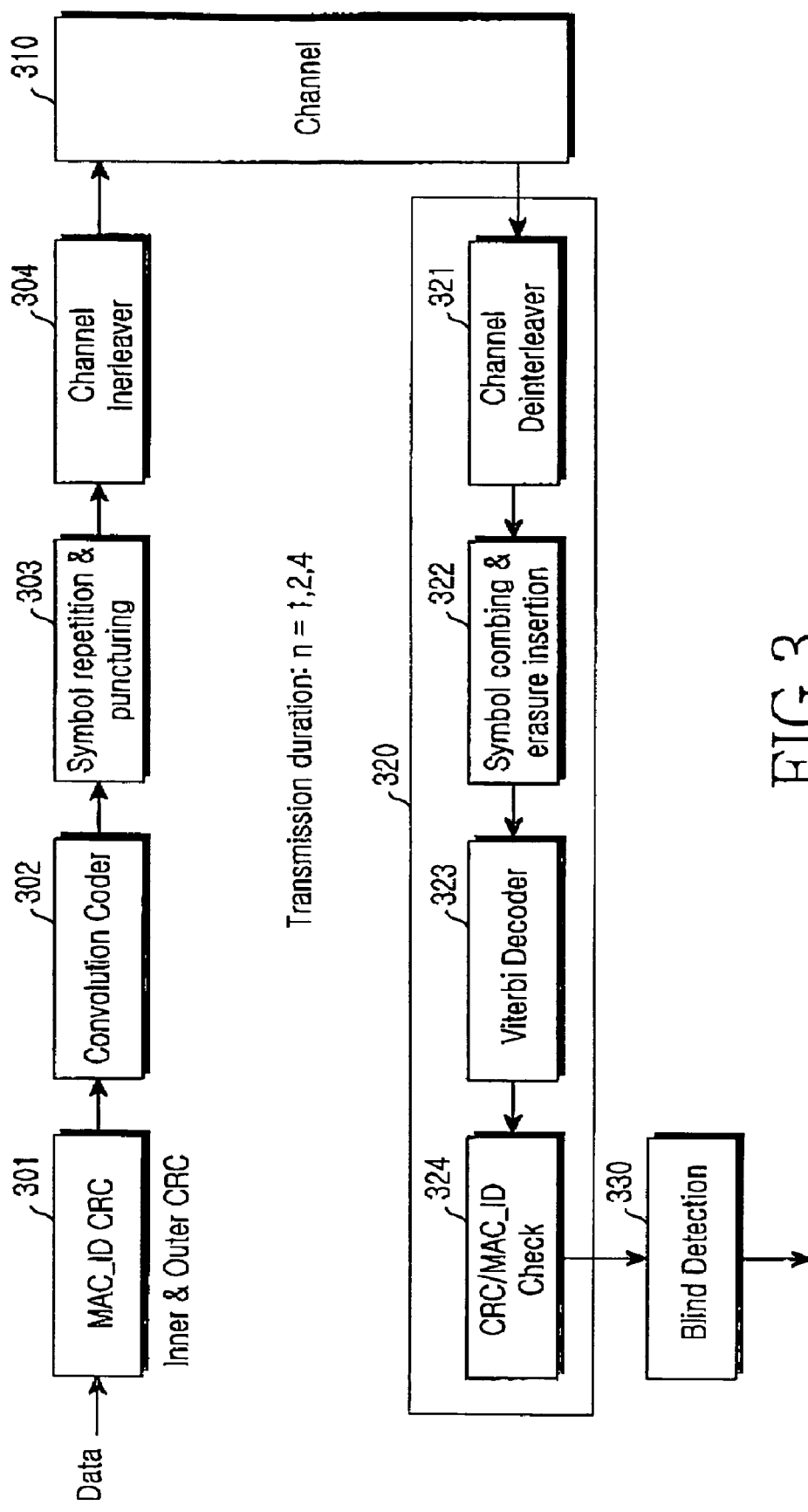
FIG. 3 is a simplified block diagram of a conventional forward packet data control channel receiver for receiving information on a forward packet data control channel in a CDMA2000 1x EV-DV system.

An embodiment of the present invention will now be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

Figure 7:
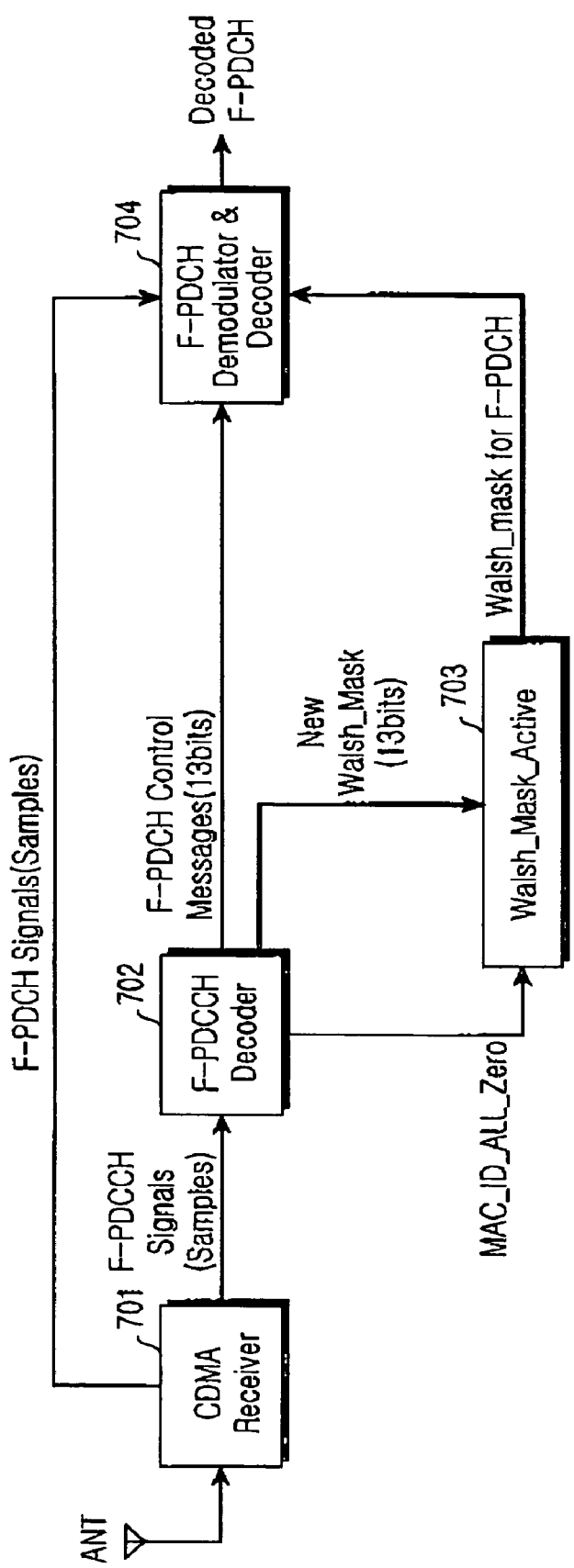
FIG. 7 is a general block diagram illustrating a conventional receiver for updating a Walsh mask based on a 1x EV-DV standard.

FIG. 7 is a general block diagram illustrating a receiver for updating a Walsh mask based on a 1x EV-DV standard. Referring to FIG. 7, a packet data channel signal and a packet data control channel signal received through a radio environment are input to a receiver 701 via an antenna ANT. The receiver 701 distinguishes a forward packet data control channel signal from a forward packet data channel signal. The receiver 701 outputs the forward packet data control channel signal to a forward packet data control channel decoder 702, and the forward packet data channel signal to a forward packet data channel demodulator/decoder 704. The receiver 701 generally comprises a pseudo-random noise (PN) despreader.

Figure 4A:
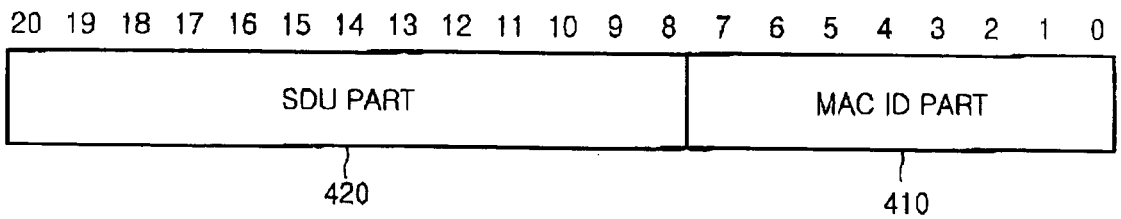
FIGS. 4A to 4D are diagrams illustrating possible formats of a conventional control message transmitted over a packet data control channel.
Figure 4B:
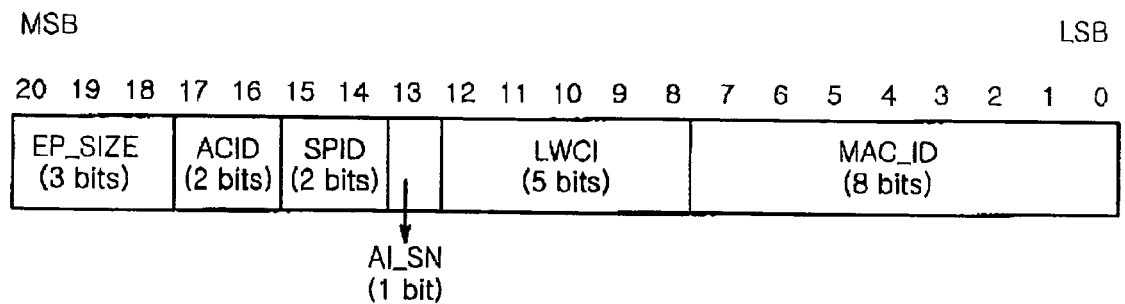
Figure 4C:
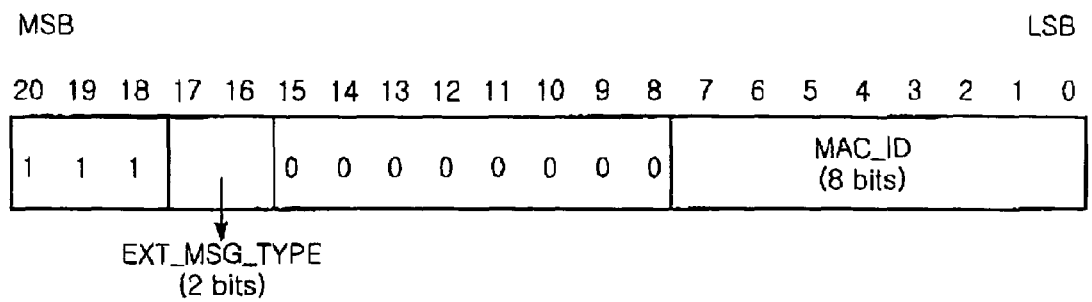
Figure 4D:
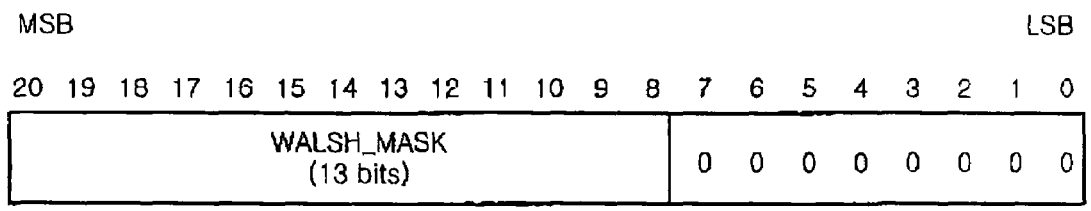
Figure 5A:
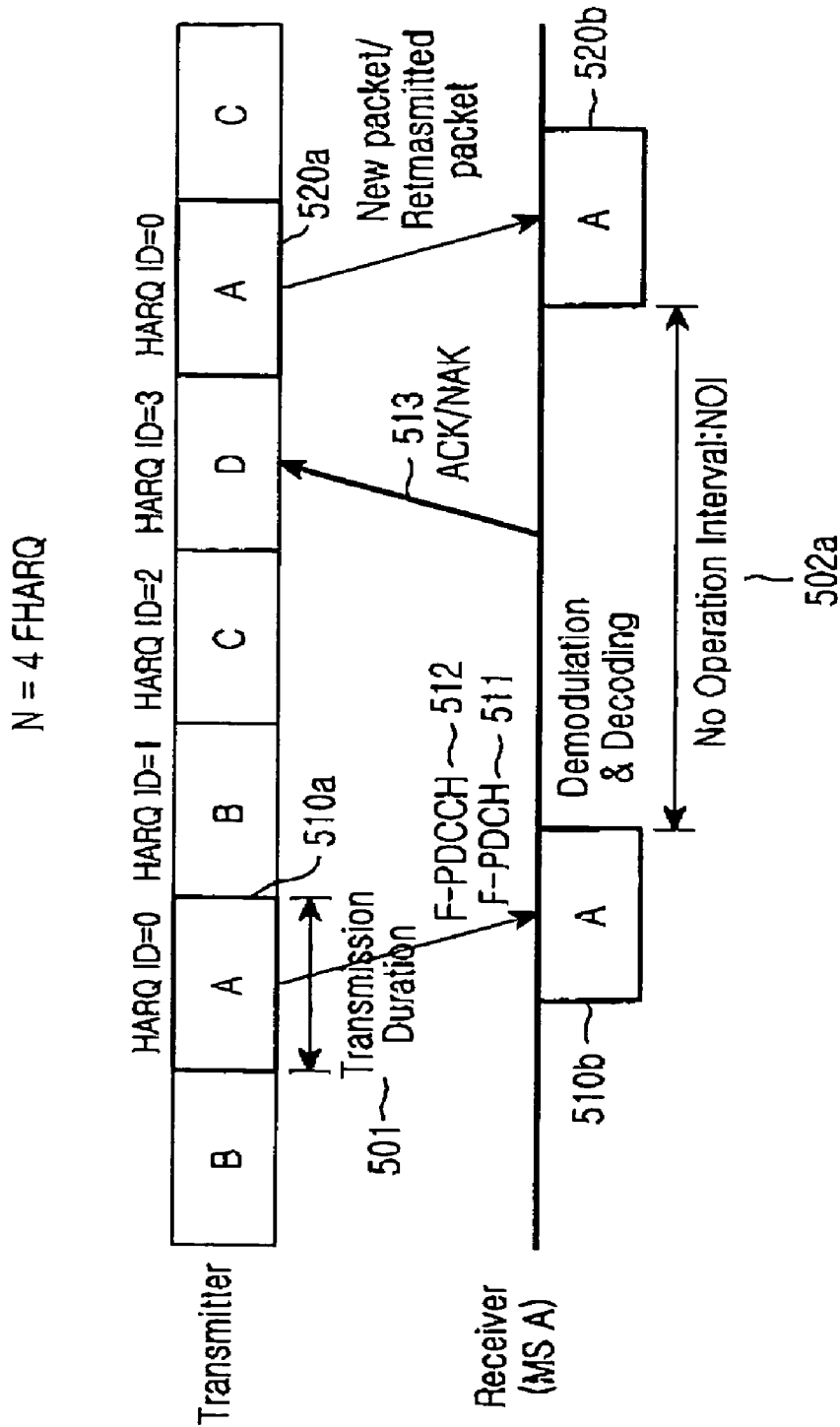
FIG. 5A is a timing diagram illustrating transmission of packet data and ACK/NAK signal in a conventional CDMA2000 1x EV-DV system employing N=4 FHARQ in which packet data is continuously transmitted to mobile stations.
Figure 5B:
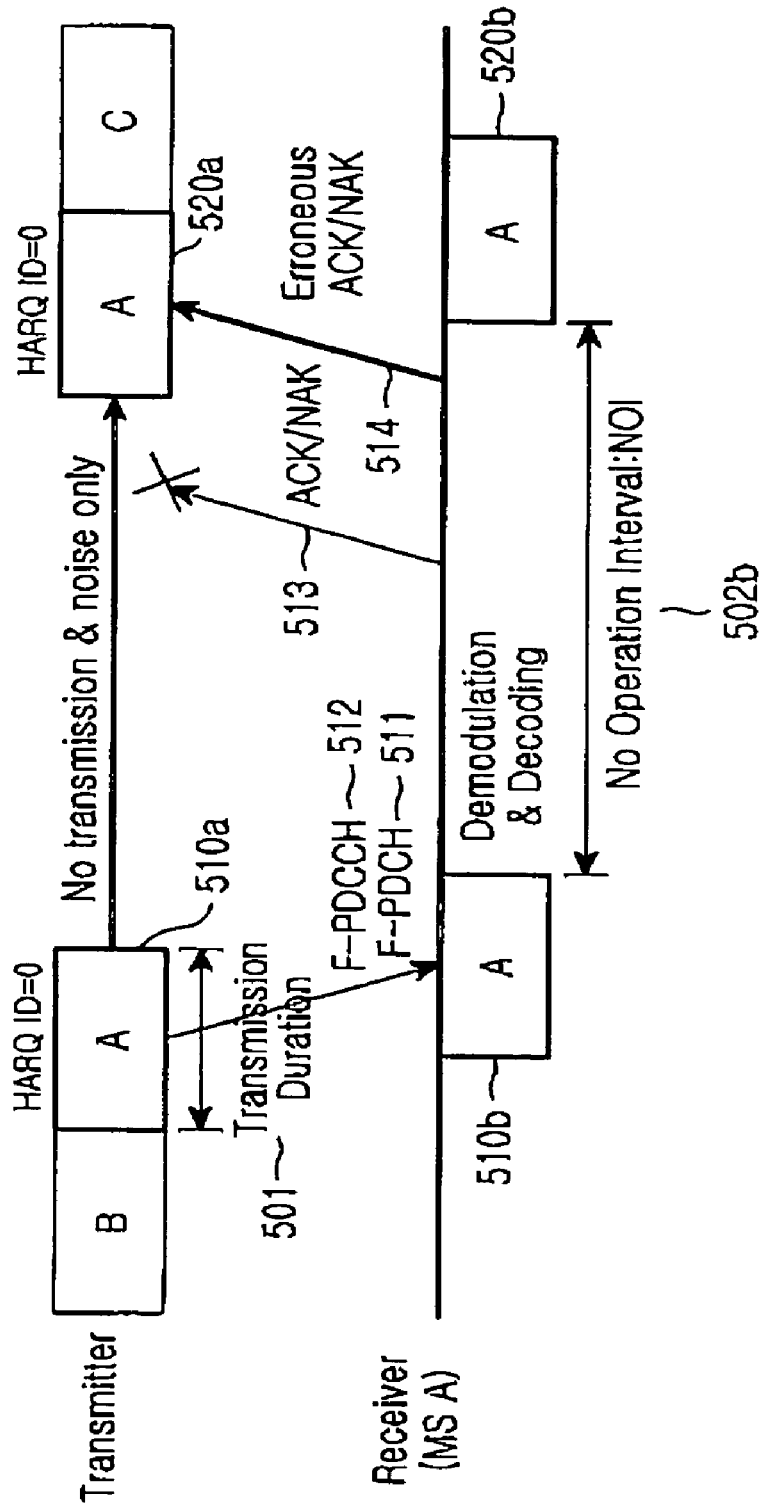
FIG. 5B is a timing diagram illustrating transmission of packet data and ACK/NAK signal in a conventional CDMA2000 1x EV-DV system employing N=4 FHARQ in which there is an interval for which no packet data is transmitted.
Figure 6:
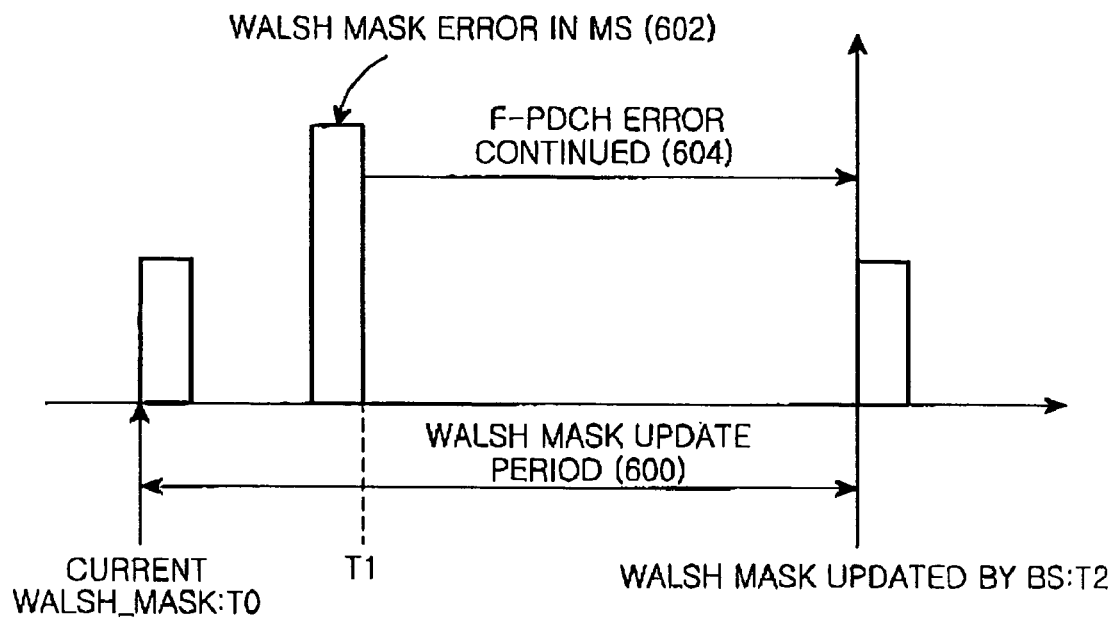
FIG. 6 is a timing diagram illustrating a time for which a conventional mobile station fails to receive packet data as a Walsh mask is changed due to an error in a forward packet data control channel.

The forward packet data control channel decoder 702 decodes its input signal and determines whether a control message with the format illustrated in FIG. 4B is received over a forward packet data control channel. If the control message is received, the forward packet data control channel decoder 702 outputs the received control message to the forward packet data channel demodulator/decoder 704. However, if a Walsh mask update signal is received, the forward packet data control channel decoder 702 outputs Walsh mask information to a Walsh mask buffer 703 to update the Walsh mask with the received Walsh mask. Generally, the Walsh mask buffer 703 comprises a software register, flip-flop register, or RAM.

The forward packet data control channel decoder 702 decodes a packet data control channel and outputs information necessary for demodulating and decoding data received over a packet data channel to the forward packet data channel demodulator/decoder 704 if information on a packet data channel is received through checking on inner and outer frame quality indicators. Then the forward packet data channel demodulator/decoder 704 demodulates and decodes data received over a packet data channel using information received from the packet data control channel decoder 702. The forward packet data channel demodulator/decoder 704 demodulates and decodes the data received over a forward packet data channel after processing the received data base on Walsh mask information output from the Walsh mask buffer 703.

However, if MAC_ID received over a forward packet data control channel has an all-zero value, the Walsh mask buffer 703 updates the Walsh mask with a Walsh mask received from the forward packet data control channel decoder 702 without time delay. In this case, a false alarm caused by a Walsh mask error may occur.

Figure 8:
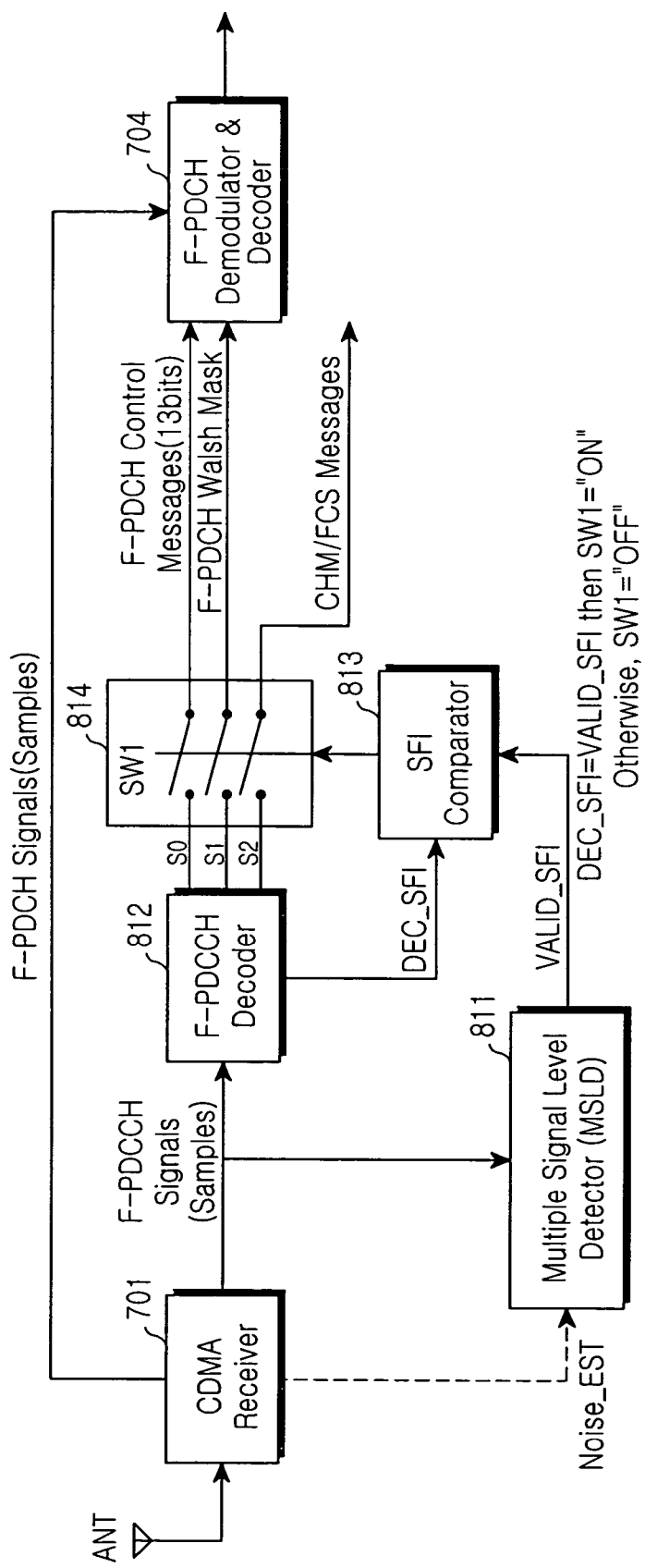
FIG. 8 is a block diagram illustrating a receiver for updating Walsh mask information according to an embodiment of the present invention.

FIG. 8 is a block diagram illustrating a receiver for updating Walsh mask information according to an embodiment of the present invention. The receiver of FIG. 8 is significantly different from the receiver of FIG. 7 in structure and operation. Referring to FIG. 8, a receiver 701 comprising a PN despreader is identical in structure to the receiver 701 described in connection with FIG. 7. The receiver 701 outputs a received signal to a forward packet data control channel decoder 812 and a multiple signal level detector (MSLD) 811. The multiple signal level detector 811 detects a level of a received signal, and outputs the detected signal level to a slot format indicator (SFI) comparator 813. The slot format indicator comparator 813 generates a switching control signal according to the signal level detected by the multiple signal level detector 811, and controls a switching operation of a switch (SW1) 814.

The forward packet data control channel decoder 812 decodes a signal received over a forward packet data control channel, and outputs the decoding result to a corresponding output terminal. A signal output to a first output terminal S0 is a 13-bit control message on a forward packet data control channel, and a signal output to a second output terminal S1 is Walsh mask information on the forward packet data control channel. Further, the forward packet data control channel decoder 812 generates a Control Hold Mode/Fast Cell Switching (CHM/FCS) message and outputs the CHM/FCS message to a third output terminal S2. The first to third output terminals S0, S1 and S2 of the forward packet data control channel decoder 812 are connected to corresponding input terminals of the switch 814. The switch 814 performs a switching operation such that outputs of the output terminals S0, S1 and S2 are input or not input to a forward packet data channel demodulator/decoder 704.

If the forward packet data control channel signal outputs a control message on a forward packet data control channel, a signal of the first output terminal S0 is input to the forward packet data channel demodulator/decoder 704. Thus, the forward packet data channel demodulator/decoder 704 demodulates and decodes packet data received over a forward packet data channel. In contrast, if a signal received over the forward packet data control channel is Walsh mask information, the forward packet data control channel decoder 812 outputs Walsh mask information to the forward packet data channel demodulator/decoder 704 via the second output terminal S1. In addition, if a CHM/FCS signal is received, the forward packet data control channel decoder 812 generates a CHM/FCS message and outputs the CHM/FCS message via the third output terminal S2.

Now, a detailed description will be made of the multiple signal level detector 811. The multiple signal level detector 811 detects a signal level of a packet data control channel output from the receiver 701. Based on the result, the multiple signal level detector 811 performs a control operation for activating (ON) or inactivating (OFF) the forward packet data control channel decoder 812. Further, the multiple signal level detector 811 outputs a F_PDCCH_DEC_VALID signal to switch a signal of an output terminal for transmitting the decoding result of the forward packet data control channel decoder 812 to other devices. If F_PDCCH_DEC_VALID is '1', the multiple signal level detector 811 outputs an SW1='ON' signal, and if F_PDCCH_DEC_VALID is '0', the multiple signal level detector 811 outputs an SW1='OFF' signal. For these reasons, there is only noise power in the non-transmission interval for which a base station transmits a forward packet data control channel signal to none of mobile stations. The multiple signal level detector 811 uses the following feature. That is, considering that it is general that a base station allocates 10% or more of the total transmission power for forward packet data control channels, a different in signal level or SNR between the case where there is no forward packet data control channel signal and the case where there is a forward packet data control channel signal is significant. Therefore, a mobile station can significantly reduce a false alarm occurring in the non-transmission interval where there is only noise power. That is, compared with the conventional technology, the embodiment of the present invention pre-checks reliability of a decoding result on a forward packet data control channel, as well as a Walsh mask update message calculated from the forward packet data control channel. Accordingly, the embodiment of the present invention provides a real-time control method for transmitting a decoding result on the forward packet data control channel to other devices only when the decoding result on the forward packet data control channel is sufficiently higher than a threshold.

Figure 9:
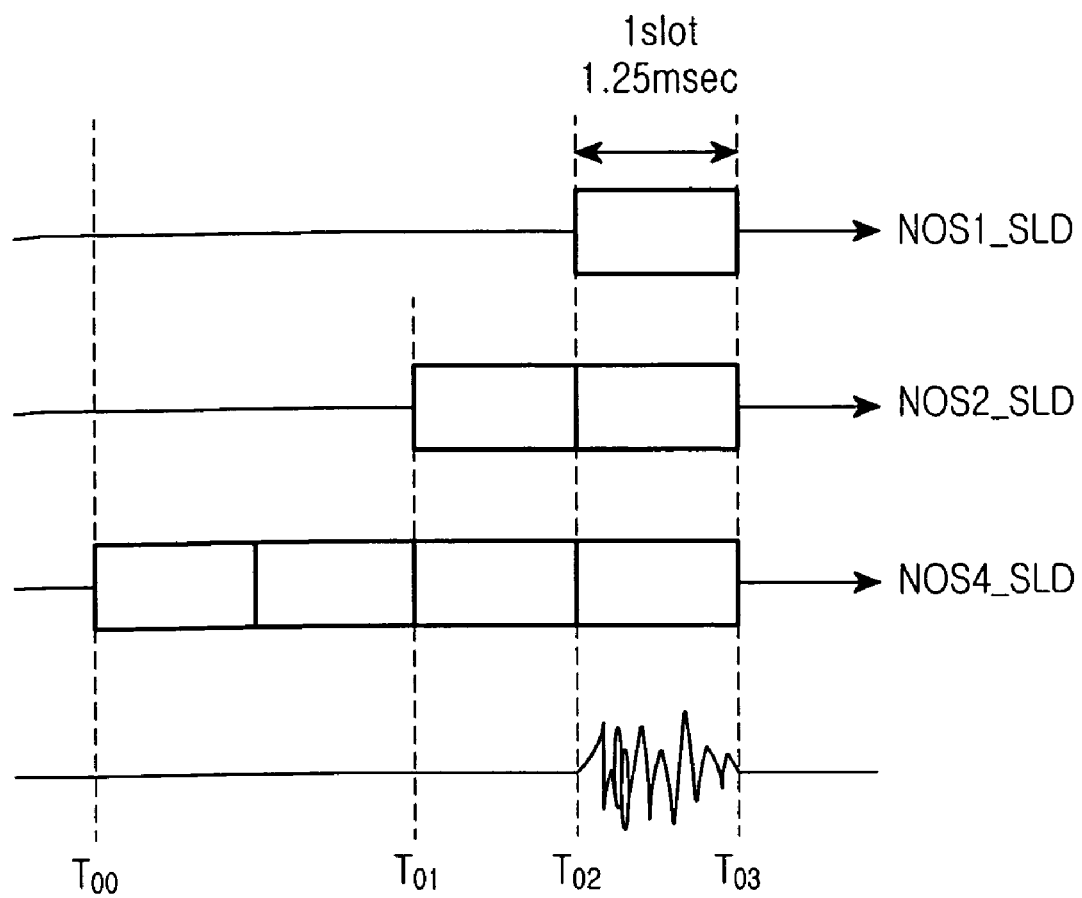
FIG. 9 is a timing diagram illustrating a method for detecting the number of slots comprising a packet data control channel in a multiple signal level detector according to an embodiment of the present invention.

FIG. 9 is a timing diagram illustrating a method for detecting the number of slots comprising a packet data control channel in the multiple signal level detector 811 according to an embodiment of the present invention. As illustrated in FIG. 9, a forward packet data control channel has 3 types of slot formats according to a transmission period of a corresponding packet data channel. Therefore, the multiple signal level detector 811 can measure a signal level for each of 1-slot format (1.25 msec), 2-slot format (2.5 msec) and 4-slot format (5 msec). However, because a mobile station does not know a slot format indicator indicating the number of slots transmitted by a base station, signal level measurement durations can be defined as illustrated in FIG. 9. This is because a start point of a slot can be generally different from a start point of a slot assumed by a receiver of a mobile station according to the number of slots comprising a packet data control channel actually transmitted by a base station. Therefore, the receiver calculates a signal level for each of a maximum of 4 slots. A signal-to-noise ratio (SNR) or CIR can be used as the signal level. An alternative method can use a simple signal level, such as energy, power and absolute signal level.

Figure 10:
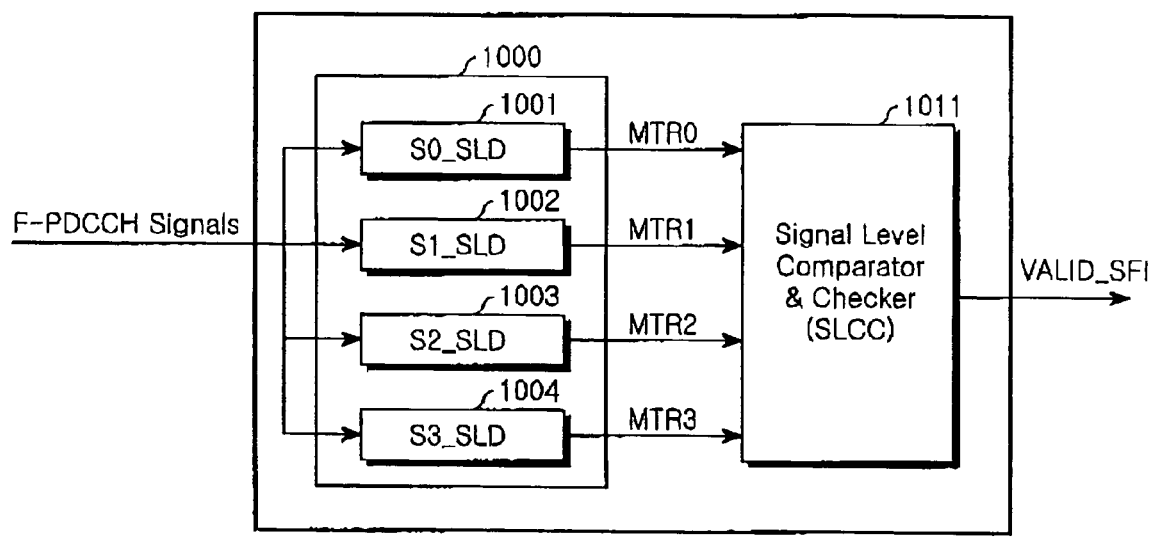
FIG. 10 is a block diagram illustrating an internal structure of the multiple signal level detector for detecting a signal level for calculating the energy of a signal according to an embodiment of the present invention.
Figure 11:
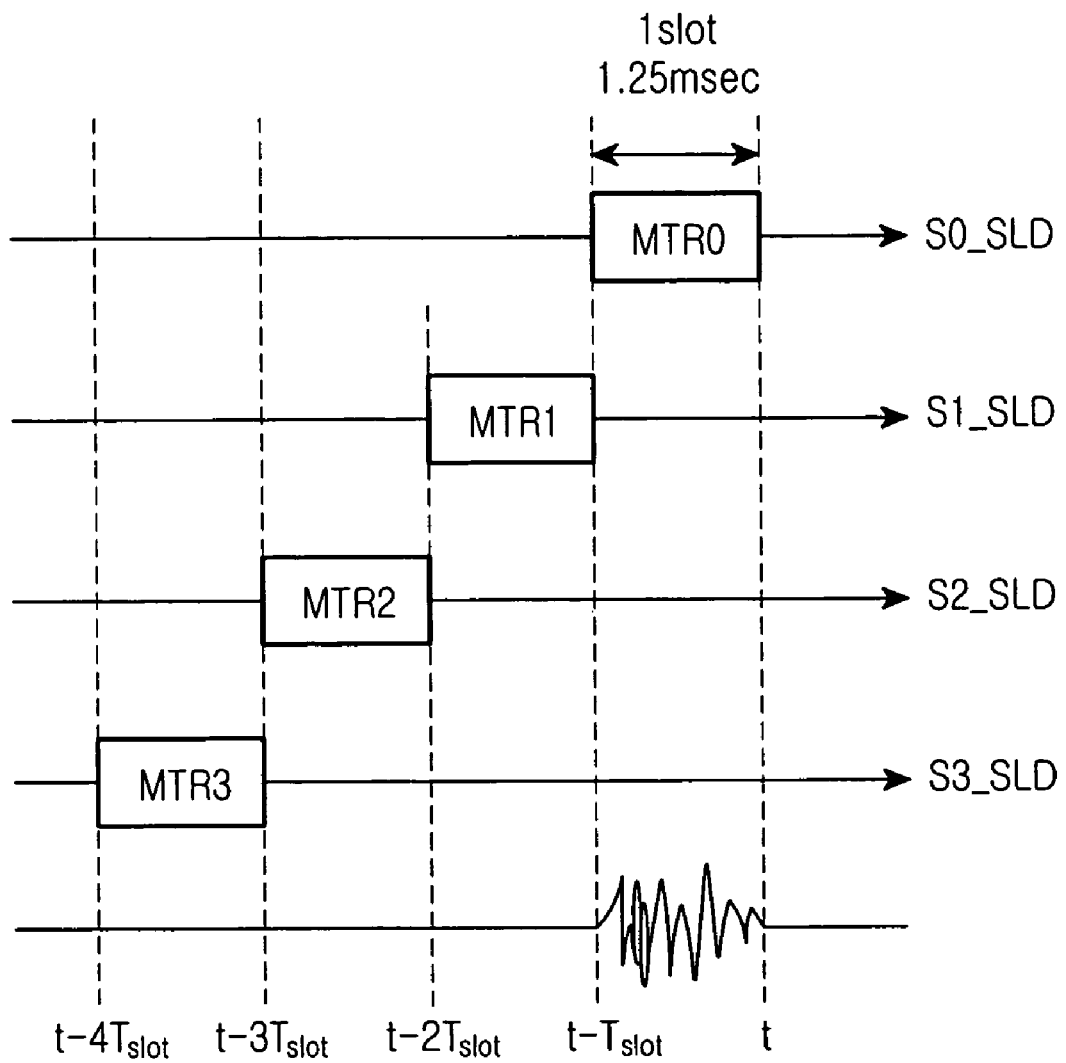
FIG. 11 is a diagram illustrating a method for detecting signal levels output from the slot level detectors for 4-slot duration according to an embodiment of the present invention.

FIG. 10 is a block diagram illustrating an internal structure of the multiple signal level detector 811 for detecting a signal level to calculate energy of a signal according to an embodiment of the present invention. Referring to FIG. 10, forward packet data control channel signals are input to a signal level detector 1000. The signal level detector 1000 is branched into 4 slot level detectors (S0_SLD, S1_SLD, S2_SLD, and S3_SLD,) 1001, 1002, 1003 and 1004. The slot level detectors 1001, 1002, 1003 and 1004 detect levels of the input packet data control channel signals, and outputs the detection results as metric values MTR0, MTR1, MTR2, and MTR3, respectively. That is, the slot level detectors 1001, 1002, 1003 and 1004 measure signal levels for 4 types of slots illustrated in FIG. 11 in order to calculate signal energies, and detect metric#0 value MTR0, metric#1 value MTR1, metric#2 value MTR2, and metric#3 value MTR3 as the measurement results, respectively. That is, the outputs of the slot level detectors 1001, 1002, 1003 and 1004 are used for checking reliability of the decoding result on a forward packet data control channel using a signal received from the receiver 701. FIG. 11 is a diagram illustrating a method for detecting signal levels output from the slot level detectors for 4-slot duration.

As illustrated in FIG. 11, the slot level detectors 1001, 1002, 1003 and 1004 sequentially operate instead of detecting metric values of consecutive slots, and a signal level comparison and checking (SLCC) part 1011 outputs a valid slot format indictor VALID_SFI according to the sequential operation results. The slot level detectors 1001, 1002, 1003 and 1004 calculate metric values using Equation (1) below.

$$MTR0 = \int_{t-T_{slot}}^{t} (S_{PDCCH}(t))^2 \, dt \qquad (1)$$

$$MTR1 = \int_{t-2T_{slot}}^{t-T_{slot}} (S_{PDCCH}(t))^2 \, dt$$

$$MTR2 = \int_{t-3T_{slot}}^{t-2T_{slot}} (S_{PDCCH}(t))^2 \, dt$$

$$MTR3 = \int_{t-4T_{slot}}^{t-3T_{slot}} (S_{PDCCH}(t))^2 \, dt$$

In Equation (1), SPDCH(t) denotes the forward packet data control channel signal of FIG. 8, and $T_{slot}$ denotes a unit slot duration of 1.25 msec. In addition, 't' denotes a time for which a signal is transmitted over a current forward packet data control channel, as illustrated in FIG. 11.

Alternatively, a multiple signal level detection scheme using noise estimation can be used in order to estimate a more accurate signal level. The multiple signal level detection scheme receives a noise estimation value represented by a dotted line in FIG. 8, and outputs a valid slot format indicator VALID_SFI based on the noise estimation value. This scheme performs the same operation except that the receiver 701 receives a noise estimation signal. That is, this scheme further uses an estimated noise value. Therefore, the multiple signal level detection scheme uses a noise estimation result calculated from the receiver 701, measures signal levels for the 4 types of slot formats illustrated in FIG. 11, and calculates SNRs from the two result values. Further, the multiple signal level detection scheme defines the SNRs as metric#0 MTR0, metric#1 MTR1, metric#2 MTR2, and metric#3 MTR3. The reason for using noise estimation is because a level of a received signal is increased or decreased at any time due to fading in a mobile communication system. Because the variation in amplitude of the received signal is compensated for to some extent by channel estimation of the receiver 701 and then input to the multiple signal level detector 811, this value is compared with an SNR in the corresponding duration. Thus, compared with the signal level measurement scheme, the multiple signal level detection scheme can provide information on a more accurate signal level. Therefore, the signal level comparison and checking part 1011 should store an SNR threshold therein. In this case, a forward packet data control channel signal means a signal whose level is adjusted by signal estimation.

A detailed description of channel estimation and noise estimation methods is not given herein, because they can be implemented with the known techniques.

Figure 12:
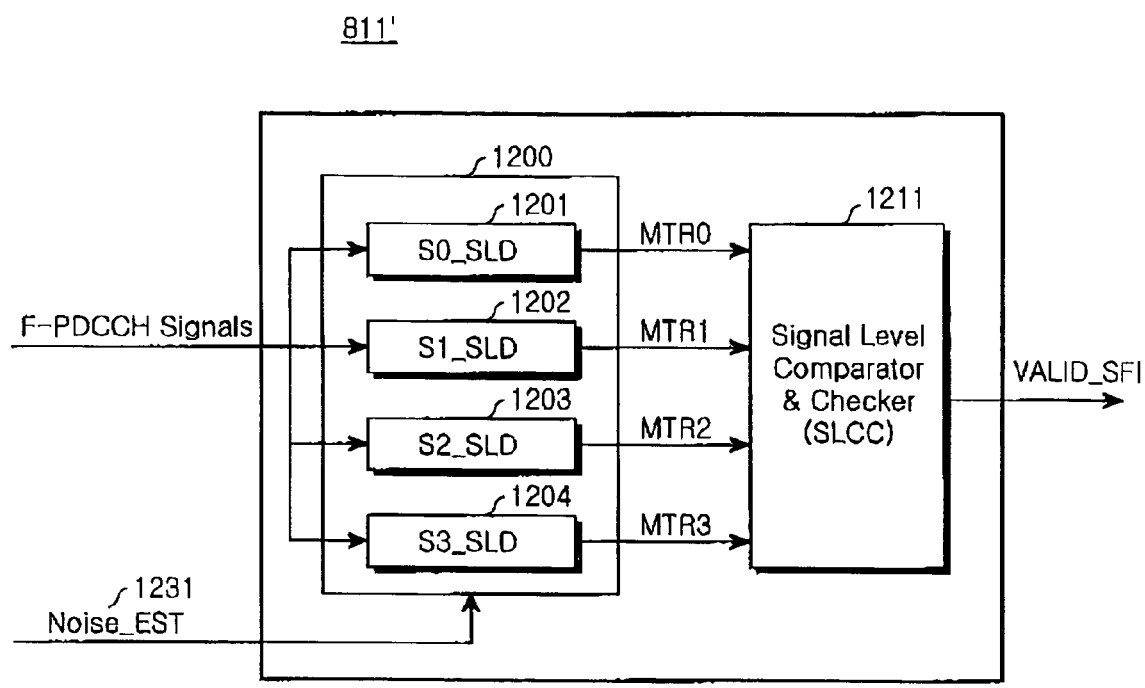
FIG. 12 is a block diagram illustrating a detailed internal structure of the multiple signal level detector using noise estimation according to an embodiment of the present invention.

FIG. 12 is a block diagram illustrating a detailed internal structure of the multiple signal level detector 811' also using noise estimation according to an embodiment of the present invention. The multiple signal level detector 811' of FIG. 12 is different from the multiple signal level detector 811 of FIG. 10 in that a noise estimation value 1231 is input to a slot level detecting part 1200. A signal level comparison and checking (SLCC) part 1211 stores a metric threshold. The threshold is the minimum value used for determining whether there is a signal. Therefore, the signal level comparison and checking part 1211 compares metric values MTR0, MTR1, MTR2 and MTR3 output from the slot level detecting part 1200 with the metric threshold stored therein, and outputs a control signal according to the comparison result. Metric values MTR0, MTR1, MTR2 and MTR3 output from slot level detectors 1201, 1202, 1203 and 1204 in the slot level detecting part 1200 are calculated by Equation (2) below.

$$MTR0 = \frac{\int_{t-T_{slot}}^{t} (S_{PDCCH}(t))^2 \, dt}{\int_{t-T_{slot}}^{t} (n(t))^2 \, dt} = SNR0 \qquad (2)$$

$$MTR1 = \frac{\int_{t-2T_{slot}}^{t-T_{slot}} (S_{PDCCH}(t))^2 \, dt}{\int_{t-2T_{slot}}^{t-T_{slot}} (n(t))^2 \, dt} = SNR1$$

$$MTR2 = \frac{\int_{t-3T_{slot}}^{t-2T_{slot}} (S_{PDCCH}(t))^2 \, dt}{\int_{t-3T_{slot}}^{t-2T_{slot}} (n(t))^2 \, dt} = SNR2$$

$$MTR3 = \frac{\int_{t-4T_{slot}}^{t-3T_{slot}} (S_{PDCCH}(t))^2 \, dt}{\int_{t-4T_{slot}}^{t-3T_{slot}} (n(t))^2 \, dt} = SNR3$$

If the metrics are determined in the manner described above, the multiple signal level detector 811' compares the determined metrics with the threshold stored in its signal level comparison and checking part 1211, and determines the reliability of a decoding result on the forward packet data control channel. Based on the reliability determination result, the multiple signal level detector 811' determines a valid slot format indicator VALID_SFI. A detailed description will now be made of the signal level comparison and checking part 1211. A threshold MTR_TH is pre-determined by average transmission power and noise power of forward packet data control channels. Because such a value can be determined through simulation or actual measurement, a detailed description thereof will not be given herein, and it is assumed that the threshold is pre-stored in the signal level comparison and checking part 1211. For example, if an average signal level in a noiseless interval is defined as $E_{s\_avg}$ and an average noise level in an interval where there is no signal is defined as $N_{avg}$, then the threshold MTR_TH can be determined by Equation (3) below.

$$\text{MTR\_TH} = \frac{|E_{s\_avg} + N_{avg}|}{2} \qquad (3)$$

The threshold MTR_TH is determined by a designer considering implementation complexity and performance of the system. It is assumed herein that the signal level comparison and checking part 1211 includes a storage (not shown) for storing the threshold. In Equation (3), both $E_{s\_avg}$ and $N_{avg}$ are positive constants.

A detailed description will now be made of a method for detecting the number of transmission slots constituting a packet data control channel for the case where the operation performed in the signal level comparison and checking part 1211 uses only the signal level and for the case where the operation uses both a signal level and noise estimation.

1. Only Signal Level Used

Condition 1: If MTR0<MTR_TH, then VALID_SFI='2slots' or '4 slots' (NOS (Number of Slots)=2 or 4)

Condition 2: If MTR0<MTR_TH and MTR1<MTR_TH, then VALID_SFI='4 slots' or (NOS=4)

Condition 3: If MTR0<MTR_TH and MTR1<MTR_TH, and MTR2<MTR_TH, then VALID_SFI='4 slots' or (NOS=4)

Condition 4: If MTR0<MTR_TH and MTR1<MTR_TH and MTR2<MTR_TH, and MTR3<MTR_TH, then VALID_SFI='None' or (NOS=None)

If Condition 1 to Condition 4 are satisfied, a control message is transmitted over a packet data control channel for corresponding transmission slots. In particular, if Condition 4 is satisfied, a control message is not transmitted, and if 'MTR0<MTR_TH' in Condition 1 is not satisfied, it can be assumed that a control message is transmitted over a packet data control channel for one slot.

2. Both Signal Level and Noise Estimation Used

A new threshold MTR_TH* for which noise estimation is considered is used as a threshold MTR_TH. For discrimination, output values of the slot level detectors 1201, 1202, 1203 and 1204 are represented by MTR0*, MTR1*, MTR2* and MTR3*, respectively. The new threshold MTR_TH* is a threshold based on SNR. A description will now be made of a slot transmission period determined based on the threshold.

Condition 1: If MTR0*<MTR_TH*, then VALID_SFI='2slots' or '4 slots' (NOS=2 or 4)

Condition 2: If MTR0*<MTR_TH* and MTR1*<MTR_TH*, then VALID_SFI='4 slots' or (NOS=4)

Condition 3: If MTR0*<MTR_TH* and MTR1*<MTR_TH*, and MTR2*<MTR_TH*, then VALID_SFI='4 slots' or (NOS=4)

Condition 4: If MTR0*<MTR_TH* and MTR1*<MTR_TH* and MTR2*<MTR_TH*, and MTR3*<MTR_TH*, then VALID_SFI='None' or (NOS=None)

Figure 13:
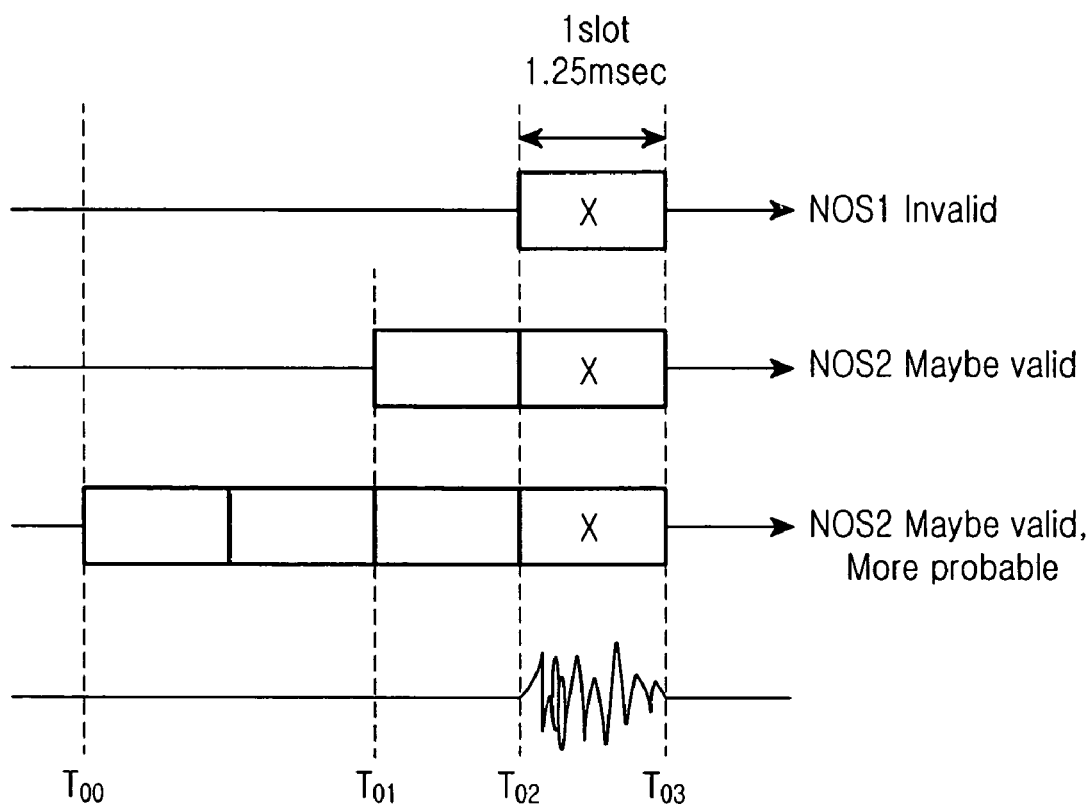
FIG. 13 is a timing diagram illustrating an example of Condition 1 according to an embodiment of the present invention.

The foregoing formulas have the following meanings. If no signal is detected for a duration of MTR0, it means that only noise exists in a NOS (Number of Slots)='1', or 1.25-msec slot format. Therefore, a slot format indicator indicating NOS='1' should not be output as a decoding result of the forward packet data control channel decoder 812. As a result, a valid slot format indictor indicates 2-slot format and 4-slot format. That is, only when a slot format indicator output by the forward packet data control channel decoder 812 based on blind slot format detection indicates 2-slot format or 4-slot format, it can be determined that the slot format indicator is valid. In the same way, if no signal is detected for durations of both MTR0 and MTR1, it means that only noise exists in NOS='1' and NOS='2', or 1.25-msec and 2.5-msec slot formats. Therefore, a slot format indicator indicating NOS='1' and NOS='2' should not be output as a decoding result of the forward packet data control channel decoder 812. As a result, a valid slot format indictor indicates a 4-slot format. Also, in the case of Condition 3, a slot format indicator indicating NOS='1' and NOS='2' should not be output as a decoding result of the forward packet data control channel decoder 812. Finally, in the case of Condition 4, it means that only noise exists in all type of slot formats. Therefore, the forward packet data control channel decoder 812 should output NOS='None' indicating that only pure noise exists for the corresponding duration. FIG. 13 is a timing diagram illustrating an example of Condition 1.

An operation of the slot format indicator (SFI) comparator 813 will be described in detail.

Operation of SFI Comparator

Condition 1: If DEC_SFI=VALID_SFI, then SW1='ON'. Otherwise SW1='OFF'

In conclusion, if the multiple signal level detector 811 determines a valid slot format indicator based on the foregoing formula, the slot format indicator comparator 813 compares a decoded slot format indicator DEC_SFI output by the forward packet data control channel decoder 812 based on blind slot format detection with a valid slot format indicator VALID_SFI output by the multiple signal level detector 812, and output data of the forward packet data control channel decoder 812 is transmitted to other devices only when the decoded slot format indicator DEC_SFI is identical to the valid slot format indicator VALID_SFI, as can be understood in the first case of FIG. 8 where noise estimation is not used and the second case of FIG. 8 where the noise estimation is used. That is, the slot format indicator comparator 813 turns on the switch (SW1) 814.

The valid slot format indicator VALID_SFI output by the multiple signal level detector 811 can be used not only to improve reliability of the forward packet data control channel decoder 812, but also to reduce a blind slot format detection processing time and power consumption of the forward packet data control channel decoder 812.

Figure 14:
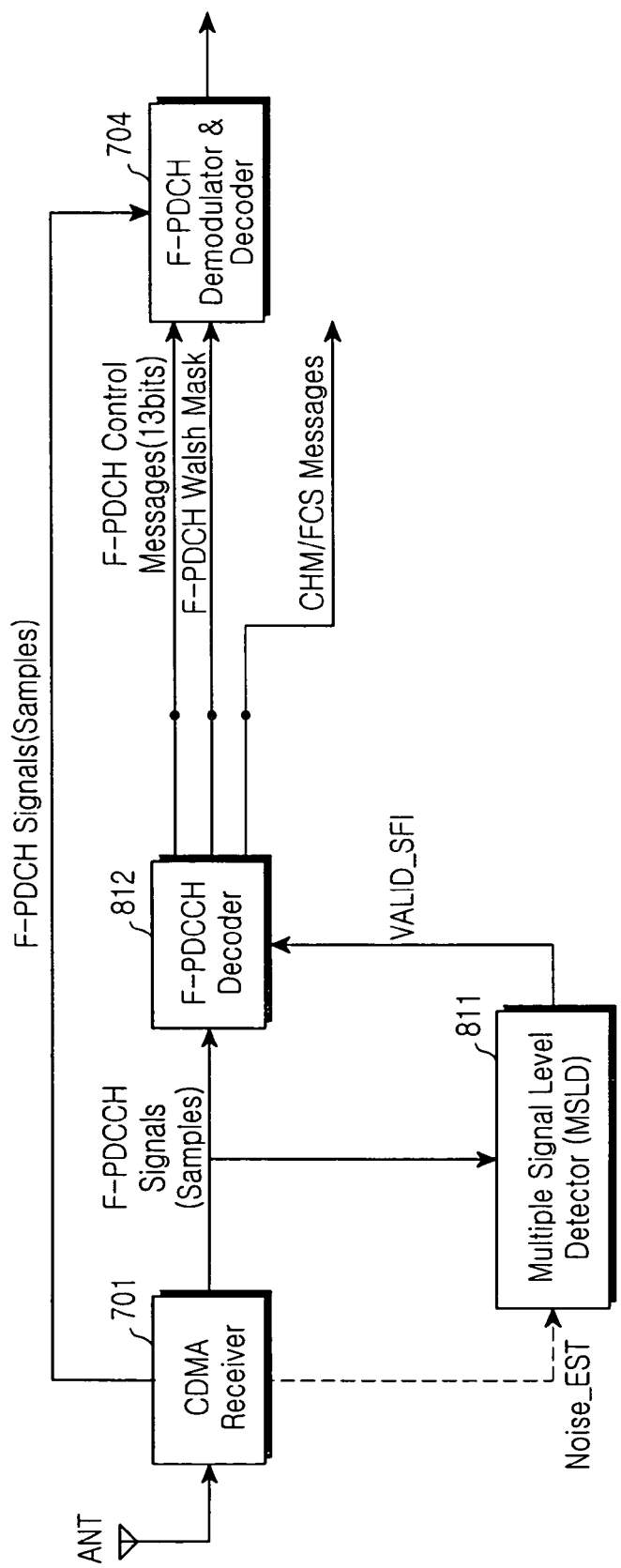
FIG. 14 is a block diagram illustrating a structure of a receiver using multiple signal level detection for pre-processing according to an embodiment of the present invention.

FIG. 14 is a block diagram illustrating a structure of a receiver using multiple signal level detection for pre-processing. The scheme described above can be regarded as one type of a post-processing scheme performed after blind slot format detection is completely performed.

Referring to FIG. 14, a multiple signal level detector 811 outputs a valid slot format indicator VALID_SFI by means of the signal level comparison and checking part 1011 or 1211. The output signal of the multiple signal level detector 811 is directly input to a forward packet data control channel decoder 812, unlike the output signal described in connection with FIG. 8. The forward packet data control channel detector 812 receiving the valid slot format indicator VALID_SFI excludes NOS defined as an invalid slot format indicator in a blind slot format detection operation, and performs blind slot format detection only on the NOS determined by the multiple signal level detector 811 as a valid slot format indicator. For example, if it is determined that only NOS='2' and NOS='4' are valid by Condition 1, blind slot format detection performs decoding on only the two NOSs. On this assumption, because a forward packet data control channel is output only for the slot format indicator determined by the multiple signal level detector 811, it is not necessary to perform the determination again after the forward packet data control channel is decoded. That is, pre-processing is possible. Further, in terms of power consumption and processing time delay, the proposed new scheme can save a minimum of 33% (⅓) and a maximum of 100% of power, compared with the conventional technology that performs blind slot format detection on all types of the slot format indicators.

A difference between the scheme of FIG. 14 and the scheme of FIG. 8 will be described herein below. The receiver of FIG. 8 compares a valid slot format indicator VALID_SFI with a decoded slot format indicator DEC_SFI, and transmits the decoding result on a forward packet data control channel only when the valid slot format indicator VALID_SFI is identical to the decoded slot format indicator DEC_SFI, thereby providing a double detection structure. That is, the receiver makes comparison using all slot format indicators determined by the forward packet data control channel decoder 812, thereby securing more accurate detection. However, the receiver of FIG. 14 may have slightly low performance because it depends 100% on the slot format indicator determined by the multiple signal level detector 811. However, because such a problem can be solved by increasing a threshold of the signal level comparison and checking part 1011 or 1211, the threshold can be determined according to target performance of the system.

As can be understood from the foregoing description, the application of the embodiment of the present invention can reduce misoperation of a mobile station caused by a defective control message. In addition, the embodiment of the present invention contributes to a reduction in the occurrence of a false alarm, thereby providing a high-quality service. Besides, the scheme proposed by the present invention can reduce a Walsh mask update error caused by a MAC_ID error in a noise channel duration or a duration where another user receives a service. This advantage contributes to a reduction in power consumption of a mobile station and to an increase in reverse channel capacity of the system.

While the invention has been shown and described with reference to a certain embodiment thereof, it should be understood by those skilled in the art that various changes in form and details may be made therein without departing from the spirit and scope of the invention as defined by the appended claims.

What is claimed is:

1. An apparatus for receiving a packet data control channel in a mobile communication system that transmits packet data and has the packet data control channel for transmitting control information related to transmission of packet data, the apparatus comprising:
    a receiver for receiving and despreading a signal on the packet data channel and a signal on the packet data control channel, separately outputting the signals, and estimating a noise of a received signal;
    a signal level detector for receiving a noise estimation value and samples of the packet data control channel signal from the receiver, and outputting a validity signal for detecting whether information received over the packet data control channel is valid; and
    a packet data control channel decoder for decoding the packet data control channel signal if the validity signal received from the signal level detector is valid.

2. The apparatus of claim 1, wherein when the packet data control channel has multiple slot lengths, the signal level detector comprises:
    a plurality of detectors for receiving the noise estimation value and detecting a signal level according to the multiple slot lengths for each slot; and
    a signal level comparator for comparing the signal level output from each of the detectors with a predetermined threshold, and outputting valid slot format information.

3. The apparatus of claim 2, wherein the signal level is a signal-to-noise ratio (SNR), carrier-to-interference ratio (CIR), or power level.

4. The apparatus of claim 2, wherein each of the detectors receives the noise estimation value output from the receiver and detects a level of the received signal.

5. The apparatus of claim 2, wherein when the packet data control channel has multiple slot lengths of 1-slot length, 2-slot length and 4-slot length, the signal level detector comprises:
    four detectors for receiving the noise estimation value and detecting reception signal levels of consecutive slots; and
    a signal level comparator for comparing the signal levels output from the four detectors with a predetermined threshold, and outputting valid slot format information.

6. The apparatus of claim 1, further comprising a packet data channel decoder for decoding the packet data channel signal output from the receiver using a decoded signal output from the packet data control channel decoder.

7. An apparatus for receiving a packet data control channel in a mobile communication system that transmits packet data in multiple slot lengths and has the packet data control channel for transmitting control information related to transmission of the packet data in multiple slot lengths, the apparatus comprising:
    a receiver for receiving and despreading a signal on the packet data channel and a signal on the packet data control channel, and separately outputting the signals;
    a signal level detecting part for receiving samples of the packet data control channel signal from the receiver and outputting a validity signal for detecting whether information received over a packet data control channel is valid;
    a packet data control channel decoder for decoding the packet data control channel signal, and outputting the decoded signal and slot format information;
    a switch for switching on or off an output of the packet data control channel decoder; and
    a slot format indicator comparator for controlling the switch using the slot format information and the validity signal.

8. The apparatus of claim 7, wherein the switch switches on or off a control message according to a comparison result of the slot format indicator comparator.

9. The apparatus of claim 7, wherein the switch switches on or off the decoded information and Walsh mask information according to a comparison result of the slot format indicator comparator.

10. The apparatus of claim 7, wherein the switch switches on or off a control hold mode/fast cell switching (CHM/FCS) message according to a comparison result of the slot format indicator comparator.

11. The apparatus of claim 7, wherein the signal level detecting part comprises:
    a plurality of detectors for detecting signal levels according to multiple slot lengths for each slot; and
    a signal level comparator for comparing signal levels output from the detectors with a predetermined threshold, and outputting valid slot format information.

12. The apparatus of claim 11, wherein the signal level is a signal-to-noise ratio (SNR), carrier-to-interference ratio (CIR), or power level.

13. The apparatus of claim 7, wherein when the multiple slot lengths of the packet data control channel have 1-slot length, 2-slot length and 4-slot length, the signal level detecting part includes four signal level detectors for detecting signal levels of four consecutive slots.

14. The apparatus of claim 7, wherein an output terminal of the switch is connected to a packet data channel decoder for decoding the packet data channel.

15. A method for receiving a packet data control channel in a mobile communication system that transmits packet data and has the packet data control channel for transmitting control information related to transmission of packet data, the method comprising the steps of:
    receiving and despreading a signal on the packet data channel and a signal on the packet data control channel, and separately outputting the signals;
    outputting a noise estimation value by estimating a noise of a signal received over the packet data control channel;
    detecting whether information is received over the packet data control channel using the noise estimation value and samples of the packet data control channel signal; and
    detecting whether a information included in the signal on the packet data control channel is valid using the noise estimation value and samples of the packet data control channel signal; and decoding the packet data control channel signal if it is determined that information is received over the packet data control channel.

decoding the packet data control channel signal if it is determined that the information is valid.

16. The method of claim 15, wherein when the packet data control channel has multiple slot lengths, the detecting step comprises the steps of:

receiving the noise estimation value and detecting a signal level according to the multiple slot lengths for each slot; and comparing the signal level detected for each slot with a predetermined threshold thereby determining whether a signal is received or not.

17. A method for receiving a packet data control channel in a mobile communication system that transmits packet data in multiple slot lengths and has the packet data control channel for transmitting control information related to transmission of the packet data in multiple slot lengths, the method comprising the steps of:

receiving and despreading a signal on the packet data channel and a signal on the packet data control channel, and separately outputting the signals;

receiving samples of the packet data control channel signal and detecting whether information is received over a packet data control channel;

and detecting whether information included in the signal on the packet data control channel is valid and outputting a validity signal;

decoding the packet data control channel signal, and detecting the decoded signal and slot format information; and switching on or off the decoded information of the packet data control channel using the slot format information and the validity signal.

18. The method of claim 17, wherein the switching step comprises the step of switching on or off a control message according to a comparison result of a slot format indicator.

19. The method of claim 17, wherein the switching step comprises the step of switching on or off Walsh mask information according to a comparison result of a slot format indicator.

20. The method of claim 17, wherein the switching step comprises the step of switching on or off a control hold mode/fast cell switching (CHM/FCS) message according to a comparison result of a slot format indicator.

21. The method of claim 17, wherein the step of detecting whether information is received over the packet data control channel comprises step of detecting a signal level according to the multiple slot lengths for each slot, comparing the signal level with a predetermined threshold, and outputting valid slot format information.

22. The method of claim 21, wherein the signal level is a signal-to-noise ratio (SNR), carrier-to-interference ratio (CIR), or power level.

23. The method of claim 17, further comprising the step of inputting the switched information to a packet data channel decoder for decoding the packet data channel.

24. The method of claim 17, wherein the step of detecting whether information is received over the packet data control channel comprises the steps of:

detecting a signal level according to the multiple slot lengths for each slot; and comparing the signal level detected for each slot with a predetermined threshold, thereby detecting whether a signal is received.

* * * * *